UNITED STATES PATENT OFFICE.

MAX BAZLEN, OF LUDWIGSHAFEN, GERMANY, ASSIGNOR TO THE BADISCHE ANILIN AND SODA FABRIK, OF SAME PLACE.

DOUBLE HYDROSULFITE AND METHOD OF MAKING SAME.

SPECIFICATION forming part of Letters Patent No. 662,339, dated November 20, 1900.

Application filed May 22, 1900. Serial No. 17,547. (No specimens.)

*To all whom it may concern:*

Be it known that I, MAX BAZLEN, doctor of philosophy, a subject of the King of Würtemberg, residing at Ludwigshafen-on-the-Rhine, in the Kingdom of Bavaria and Empire of Germany, have invented new and useful Improvements in Double Hydrosulfites of Zinc and an Alkali, of which the following is a specification.

My invention relates to the production of certain new solid stable and soluble double salts of hydrosulfurous acid containing zinc and an alkali—namely, sodium, potassium, or ammonium. They may be obtained by double decomposition between hydrosulfite of one of the above-specified metals (including ammonium) and another suitable salt (preferably the chlorid) of some other of the above-specified metals, provided, of course, that in all cases a zinc salt takes part in the reaction. Suitable salts are the chlorids of all these metals and the nitrates and acetates of the alkalies. To produce zinc sodium hydrosulfite, for instance, a solution of zinc hydrosulfite may be treated with common salt, or, on the other hand, a solution of sodium hydrosulfite may be treated with zinc chlorid, in both cases the same salt being formed. So far as the nature of the resulting product is concerned these processes are the equivalents of one another. These salts possess the composition represented by the general formula $Zn(MS_2O_4)_2xH_2O$, (M representing an alkaline metal, including ammonium.) In the following I will employ M where it appears in a chemical formula to designate an alkali metal, such as sodium or potassium, or an alkali residue, such as ammonium, the composition of the zinc sodium hydrosulfite, for example, corresponding to $Zn(NaS_2O_4)_2 2H_2O$.

In order that my new double salts may be obtained in the pure condition and remain stable in the presence of air, I have discovered that they must be rapidly freed from moisture and that this is best attained by washing them after they have been collected on the filter with acetone or other medium which is easily miscible with water and evaporates readily. If desired, a washing with ether can follow the washing with acetone, whereby the drying is still more expeditiously effected. The same result cannot be obtained by drying the salts in vacuum before such treatment with a volatile compound, as a certain amount of decomposition always seems to take place in this case.

The following examples show how my invention may be carried into practical effect and my new product obtained:

*Example 1—Double salt of zinc sodium hydrosulfite from a solution of zinc hydrosulfite.*—Prepare zinc-hydrosulfite solution from zinc bisulfite and zinc dust or from zinc bisulfite, aqueous sulfurous acid, and zinc dust or from aqueous sulfurous acid and zinc dust alone. Heat one hundred (100) parts, by volume, of a solution of such strength that five liters reduce one kilogram pure indigo to a temperature of from 50° to 60° centigrade and while stirring or agitating add twenty to twenty-five (20 to 25) parts, by weight, of common salt. The crystalline precipitate which separates out on cooling consists, practically completely, of my new zinc sodium hydrosulfite of the formula $$Zn(NaS_2O_4)_2 2H_2O$$

and gives off its water of crystallization at 100° to 110° centigrade. It may contain a small quantity of unchanged zinc hydrosulfite.

*Example 2—Double salt of zinc and sodium hydrosulfite from a solution of sodium hydrosulfite.*—Add twenty-two (22) parts, by weight, of solid zinc chlorid to one hundred (100) parts, by volume, of a sodium-hydrosulfite solution, (containing about eight to twelve per cent. thereof.) The solution becomes warm and the double salt at once begins to separate out. Salt out the rest of the double salt remaining in solution by the addition of common salt to the filtrate.

In both these examples the resultant product may with advantage be washed with acetone until the water adhering to the salt is removed. Instead of acetone ethyl or methyl alcohol or similar bodies easily miscible with water and sufficiently volatile may be used, and these can finally be displaced by ether, if desired. In a similar manner other double salts of zinc and alkali hydrosulfite may be obtained.

My new double hydrosulfites occur in the form of a white crystalline body, which in the dry condition is stable in the presence of air for months. Their composition is expressed by the general formula $Zn(NaS_2O_4)_2xH_2O$. (M represents an alkali radical.) On heating, the water of crystallization is first given off and then sulfurous acid. Indigo-sulfonic-acid solution is decolorized by my new product. The specified double hydrosulfite which I desire to claim has all the above-mentioned generic properties, and its composition is expressed by the formula $Zn(NaS_2O_4).2H_2O$.

What I claim is—

1. The process for the production of a double hydrosulfite of zinc and an alkali which consists in treating zinc hydrosulfite with a salt of an alkali, washing the separated product with a volatile medium of drying, all substantially as hereinbefore described.

2. The process for the production of a double hydrosulfite of zinc and an alkali which consists in treating zinc hydrosulfite with a salt of an alkali, all substantially as hereinbefore described.

3. As a new product the double hydrosulfite of zinc and an alkali which has a chemical composition corresponding to the formula $Zn(MS_2O_4)_2.xH_2O$ and is stable for months in the presence of air, and which gives off sulfurous acid when heated without burning.

4. As a new product the compound hydrosulfite of zinc and sodium which has a chemical composition corresponding to the formula $Zn(NaS_2O_4)_2.2H_2O$ and which is stable for months to the presence of air, which gives off sulfurous acid when heated without burning, and which decolorizes a solution of indigo-sulfonic acid.

In testimony whereof I have hereunto set my hand in the presence of two subscribing witnesses.

MAX BAZLEN.

Witnesses:
    PERCY J. JONES,
    J. L. HEINKE.